United States Patent [19]
Clauter et al.

[11] Patent Number: 5,563,781
[45] Date of Patent: Oct. 8, 1996

[54] DUAL-MODE POWER CONVERTER

[75] Inventors: Steven T. Clauter, Scottsdale; Gary M. Orman, Paradise Valley; Fred Boatwright; Robert Gordon, both of Mesa, all of Ariz.

[73] Assignee: Integrated Technology Corporation, Tempe, Ariz.

[21] Appl. No.: 157,877

[22] Filed: Nov. 24, 1993

[51] Int. Cl.$^6$ .................................................. H02M 7/00
[52] U.S. Cl. ............................................................ 363/124
[58] Field of Search ............................. 363/50, 74, 76, 363/78, 80, 81, 82, 124

[56]      References Cited

U.S. PATENT DOCUMENTS

| | | | |
|---|---|---|---|
| 4,323,960 | 4/1982 | Jones | 363/48 |
| 4,346,431 | 8/1982 | Steigerwald | 363/27 |
| 4,641,234 | 2/1987 | Bonal | 363/124 |
| 4,884,183 | 11/1989 | Sable | 363/41 |
| 4,933,624 | 6/1990 | Kumar | 323/259 |
| 4,950,974 | 8/1990 | Pagano | 323/222 |
| 5,019,952 | 5/1991 | Smolenski et al. | 363/124 |
| 5,063,490 | 11/1991 | Maehara et al. | 363/124 |
| 5,095,261 | 3/1992 | Schoofs | 323/222 |
| 5,097,402 | 3/1992 | Kriz et al. | 363/61 |
| 5,119,283 | 6/1992 | Steigerwald et al. | 363/37 |
| 5,179,508 | 1/1993 | Lange et al. | 363/16 |
| 5,274,540 | 12/1993 | Maehara | 363/124 |

*Primary Examiner*—Matthew V. Nguyen
*Attorney, Agent, or Firm*—Renner, Otto, Boisselle & Sklar, P.L.L.

[57]      ABSTRACT

An efficient off-line rectified, high-power, AC-to-DC power supply is provided. High-power factor and minimal circuit size, cost, and complexity are achieved by combining switchmode power converter operation as well as conduction-mode operation. The switchmode power converter is controlled such that only a fraction of the output power is converted by the switchmode power converter. Peak power is efficiently conducted directly from an AC line to a DC output without requiring the operation of the switchmode power converter. Such control method results in high efficiency, yet also maintains a high-power factor with optimally sized, cost-effective switchmode power converter electronics. A complete, self-contained system is provided including a soft-start, full-wave bridge.

20 Claims, 7 Drawing Sheets

DUAL-MODE POWER CONVERTER WITH HYSTERETIC CONTROL

DUAL-MODE POWER CONVERTER

TECHNICAL FIELD OF THE INVENTION

The present invention relates generally to off-line rectified AC-to-DC power converters and, more particularly, to the control of a high-power AC-to-DC supply, applicable to both U.S. and European single-phase AC power sources, which operates with high efficiency, high-power factor and low harmonic distortion.

BACKGROUND OF THE INVENTION

Switchmode power converters are known in the art. In order to improve the efficiency of DC power supplies, switchmode power converters are often used. Despite improved efficiency, however, power losses still result in the switchmode power converters as a result of power switching losses, magnetic core losses, copper losses in conductors, and conduction losses in power semiconductors.

An important limitation of conventional power supplies using a switchmode power converter is the requirement that all the DC output power must be converted and handled by the switchmode power converter. Thus, there can be considerable power dissipation and expense associated with these converters, especially at high-power levels.

Whenever off-line rectified AC-to-DC supplies are employed, the line efficiency or power factor is of interest. As will be appreciated, even simple off-line rectified AC-to-DC power supplies will have poor line efficiency due to the low power factor. The combination of a rectifier and filter capacitor allows line current to flow only in short, uncontrolled surges near each peak of the sinewave voltage input. In order to improve power factor, AC line currents must be shaped into a sinewave which closely matches the input voltage throughout the entire input AC sinewave.

Traditional approaches to improving the power factor have typically utilized switchmode power converters which handled all the power delivered to the output. Therefore the size, cost, and complexity of the switchmode power converter was directly related to the output power.

Figure 1:
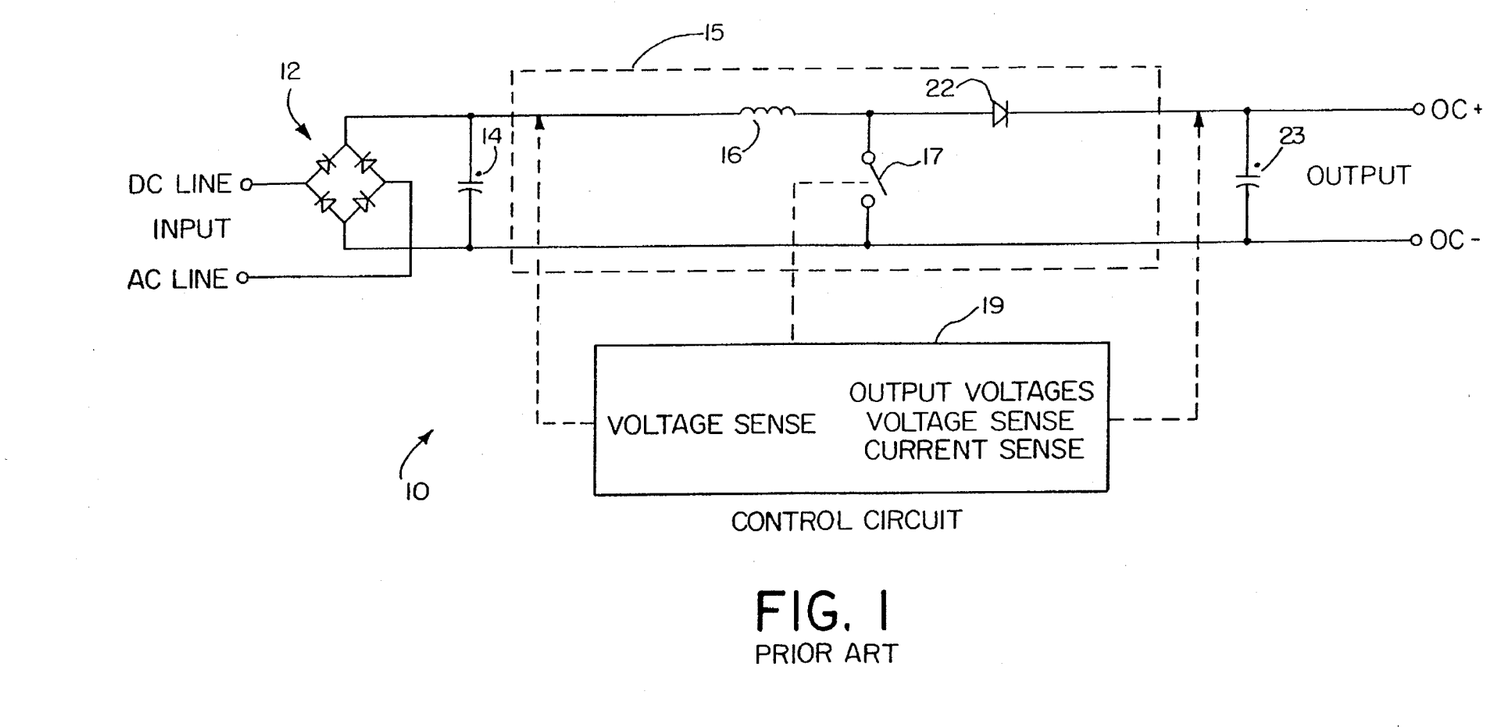
FIG. 1 is a schematic diagram of conventional switchmode power converter.
Figure 2:
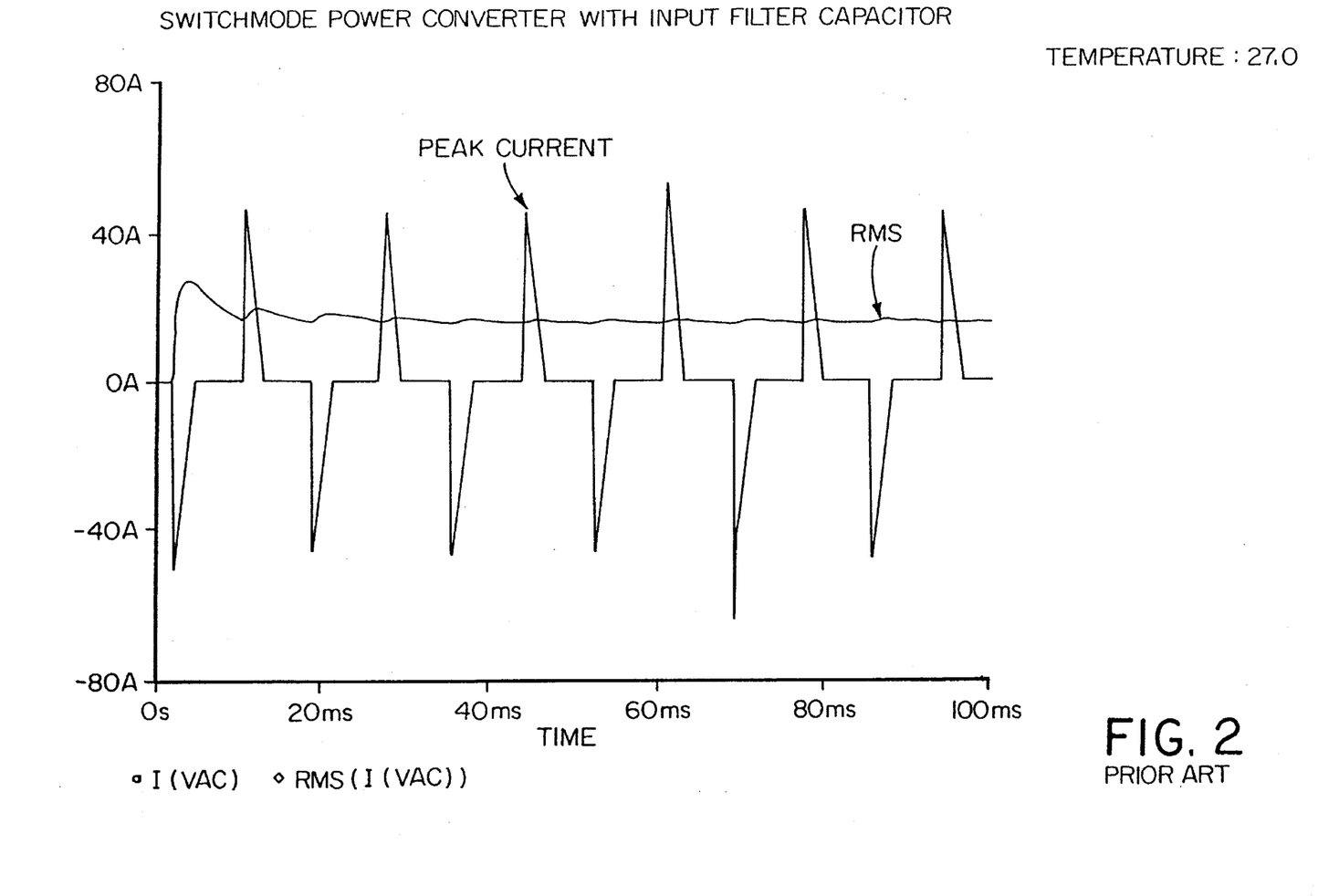
FIG. 2 is a waveform diagram illustrating the peak and RMS AC line currents for a conventional switchmode power converter including an input filter capacitor.
Figure 3:
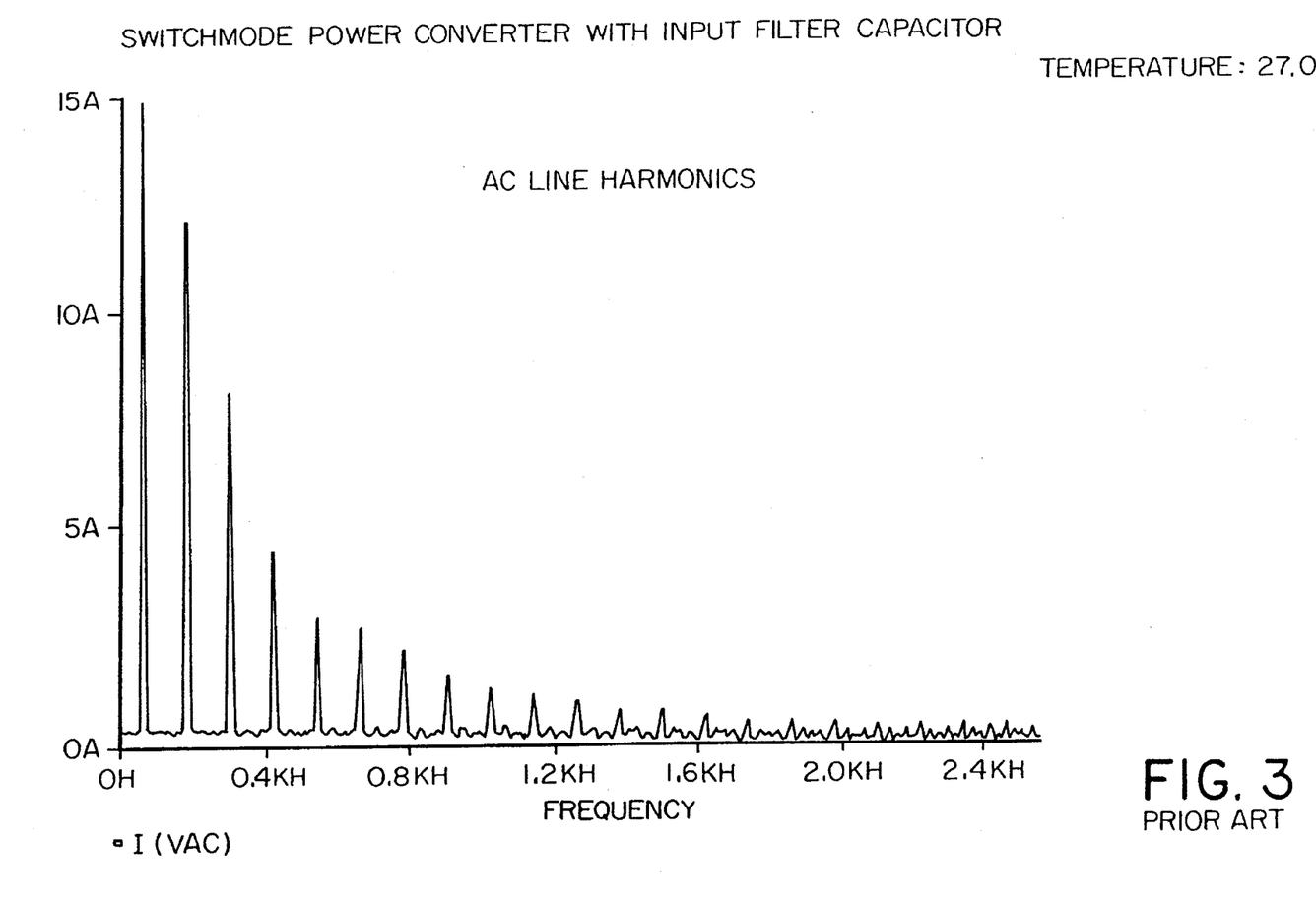
FIG. 3 is a Fourier waveform diagram illustrating the AC line current harmonics for a conventional switchmode power converter including an input filter capacitor.

FIG. 1 is a schematic diagram of a standard off-line rectified AC-to-DC power supply 10. The power supply 10 includes an AC line rectifier 12 and an input filter capacitor 14 for providing power to a conventional switchmode power converter 15. The switchmode power converter 15 includes an inductor 16 connected in series with a switch 17. The inductor 16 and switch 17 are connected in parallel across the input filter capacitor 14 and the positive and negative terminals of the rectifier 12. A control circuit 19 modulates the switch 17 between an open and closed position as a function of the voltage across an output filter capacitor 23. As a result, a boosted output voltage is provided through diode 22 across the output filter capacitor 23. The resulting peak current and RMS AC line current represented in FIG. 2, and the Fourier waveforms in FIG. 3, clearly show the poor line efficiency, low power factor, and high harmonic content of the AC line current resulting from the short, high pulses of input current in the circuit of FIG. 1. The odd harmonics of the line frequency are particularly troublesome. It is of interest to note that these current pulses will be produced regardless of the type, design, or control method used in the switchmode power converter because the input filter capacitor 14 determines the magnitude and shape of the input AC line current.

U.S. Pat. No. 5,179,508 to Lange et al. describes a standby boost converter which utilizes a bypass diode. However, power factor control is not possible using the boost converter described in the '508 patent because of an input filter capacitor. Moreover, the boost converter must be sized to supply full, peak load current and voltage.

In view of the aforementioned shortcomings associated with conventional AC-to-DC power supplies using a switchmode power converter, there is a need for a high efficiency power supply which is efficient even at high power levels. Moreover, there is a need for an off-line rectified AC-to-DC power supply having a high power factor without sacrificing overall efficiency. In addition, there is a strong need for such a power supply which provides high power factor, high efficiency operation with minimal circuit size, cost and complexity.

SUMMARY OF THE INVENTION

It has been found that a switchmode power converter is not required to operate throughout the entire AC sine voltage waveform to achieve high power factors. This is a fundamentally different mode of operation for an AC-to-DC power source. By limiting the operation of the switchmode power converter to the sides of the AC sinewave input voltage and then allowing power from the AC line to conduct directly, either through or around the switchmode power converter, during the peak portion of the input AC sine voltage waveform, high power factors are still maintained. The resulting AC line currents have drastically reduced AC line harmonic content compared to a conventional switchmode power converter with an input filter capacitor.

Utilizing partial operation of the switchmode power converter yields nearly unity power factors and preserves the advantages of a switchmode power converter without requiring that all the power be converted through the switchmode electronics. This saves a substantial amount of cost, size, and complexity in the switchmode power converter, especially compared to the current state-of-the-art.

The present invention provides an off-line AC-to-DC supply and control method which results in improved power factor using a combination of a lowpower switchmode converter and a high peak power conduction-mode current path. During each cycle of the AC line, the control method adjusts the input AC line current to match the AC line voltage sinewave. This same control method also limits the operation of the switchmode power converter, thereby minimizing size, cost, and complexity. As a result, the amount of power handled by the switchmode power converter is limited to less than the maximum power rating of the DC output. The control method steers the additional power to be conducted directly from the AC input to the DC output without degrading the power factor of the AC line. This combination of modes of operation yields the description, "dual-mode power converter", or DMPC. A feature of the dual-mode power converter is the sharing of the output power between the switchmode power converter and a conduction-mode current path.

The dual-mode power converter handles only a fraction of the full output power with its switchmode power converter. Peak power is conducted directly from the input to the output through the conduction-mode current path. Even though the harmonic distortion may be slightly higher with the dual-mode power converter, the power factor is still very high. Significantly, the cost and size of the dual-mode power converter is less than half that of a conventional switchmode power converter which handles all the load power.

In order to change operating modes between the switchmode power converter operation mode and the conduction operation mode, the dual-mode power converter monitors the sinewave of the input AC voltage. Large, energy storage, input filter capacitors following the line rectifiers found in conventional switchmode power converters are not utilized. The control method of the present invention allows the switchmode power converter to deliver power into the load up to a specified power level. Above that level, the control method will shut down the switchmode power converter and allow the power to conduct directly from the AC input to the DC output. The switchmode power converter operates on the sides of the input AC line voltage sinewave while the control system enables the current to conduct directly from the AC line to the DC output during the peak of the AC voltage sinewave. The dual-mode power converter in the preferred embodiment will switch modes back and forth on every half of the AC voltage sinewave to deliver full power to the load.

The dual-mode power converter utilizes a hysteretic current control method which provides a smooth transition from switchmode operation to conduction mode, and vice versa. The switchmode power converter is controlled to maintain the input AC current within an upper and lower sinewave current limit envelope. This envelope could also be considered to be the maximum power curve for the switchmode power converter. If the output power demand to the load exceeds this envelope, the switchmode power converter is turned off and power is conducted, rather than converted, to the output. In order to maximize efficiency, the exact path of the current when in the conduction-mode is preferably selected to be the most direct path possible from the AC line through the bridge rectifiers to the output. The output DC voltage is designed to be softly regulated to allow the output DC voltage to follow the input AC voltage during the conduction mode.

The dual-mode power converter of the present invention also includes control circuitry for providing initial softstart and undervoltage lockout. When AC line power is initially applied to the control circuitry, the switchmode power converter and the SCRs in the full-wave bridge rectifier circuit will be held in the OFF condition until all internal power supplies are stable and within voltage limits. Then the SCRs slowly turn on and the switchmode power converter is enabled. Thereafter, if the AC line should ever drop below specified limits, the control will again disable the switchmode power converter and SCRs until all internal power supplies are normal. Furthermore, the DC output voltage is limited to a maximum DC level. If the DC output is suddenly unloaded or has no load to start with, the DC voltage will rise very sharply. If the DC output voltage rises high enough to reach the upper operating limit, the switchmode power converter will shut down until the voltage is reduced below a setpoint to begin normal operation again.

In addition, the control circuitry provides for a power-up softstart inrush current ramp. A common problem with the use of full-wave bridge circuits is to control the initial line current surge when AC line power is first applied. This line current surge is the result of filter capacitors being charged. The power-up softstart capability involved with the dual-mode power converter utilizes two (2) SCRs in the full-wave bridge circuit. When the AC line is first applied, or if the AC line power is lost and then restored, the SCRs will block current through the full-wave bridge and then gradually ramp current up until the SCRs are in full conduction. This control method works repeatedly and reliably under all load, line, and temperature conditions. The control circuitry also monitors and maintains control of operating currents. If current flow through the dual-mode power converter exceeds its operating limits, the SCRs in the full-wave bridge will shut down the system and provide a fault output.

According to one particular aspect of the invention, a dual-mode power converter is provided including switchmode power converter means for converting and delivering power from an AC input to a DC output; conduction mode means for delivering power directly from said AC input to said DC output; and control means for controlling operation of said switchmode power converter means and said conduction mode means as a function of said power delivered to said DC output.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

The present invention will now be described with reference to the drawings wherein like reference labels are used to refer to like elements throughout.

Figure 4:
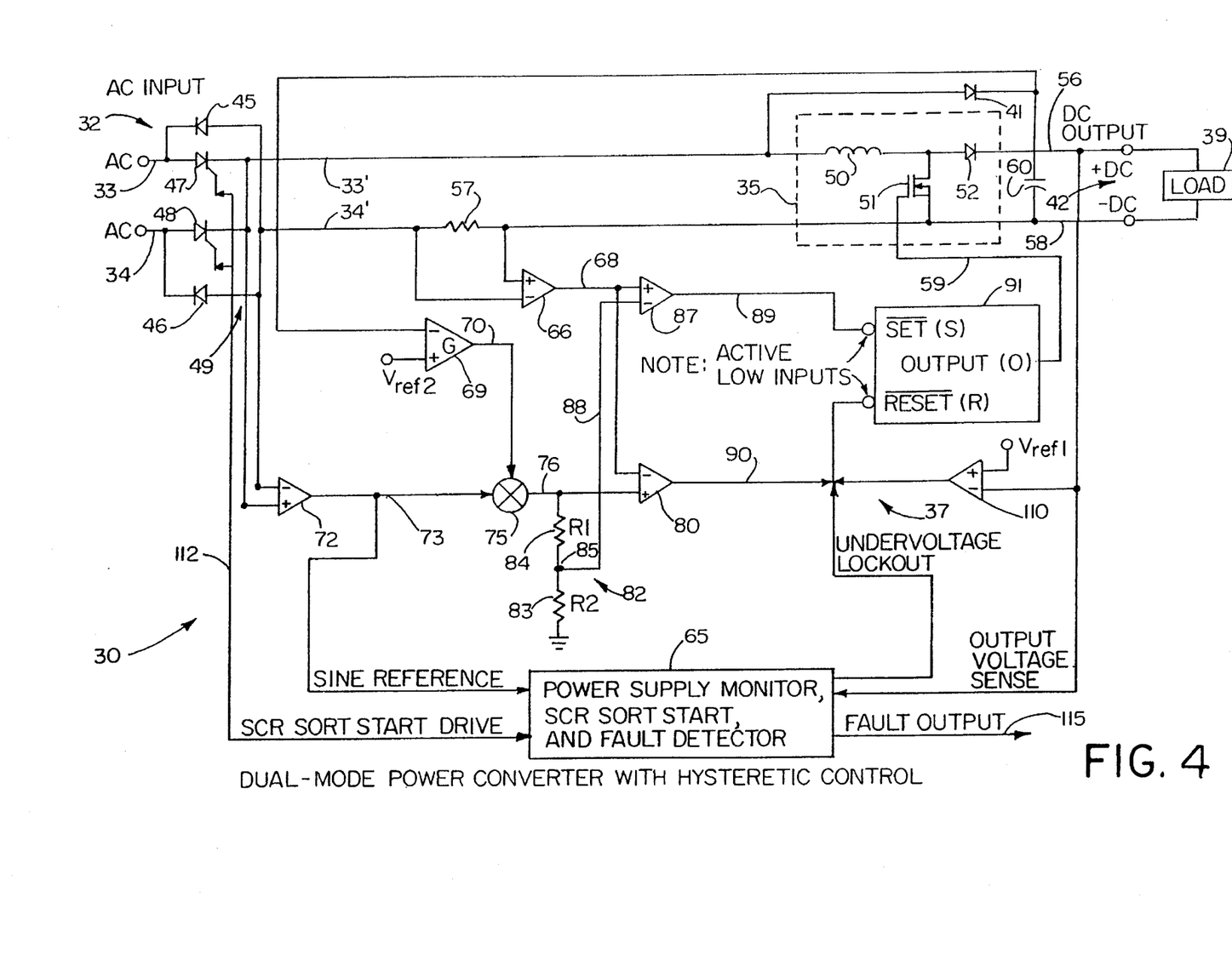
FIG. 4 is a schematic diagram of a dual-mode power converter in accordance with the present invention.

Referring initially to FIG. 4, a dual-mode power converter in accordance with the present invention is designated 30. The dual-mode power converter 30 includes a full-wave rectifier 32 for receiving AC power provided from an AC source (not shown) across AC lines 33 and 34. The dual-mode power converter 30 also includes a switchmode power converter 35 which is controlled by a control circuit 37. During switchmode operation, the switchmode power converter 35 delivers power to a load 39. An optional conduction-mode diode 41 is included and provides a conduction path through which power is conducted directly from the AC line to the DC output 42 and the load 39 during conduction mode operation. The control circuit 37 selectively switches the dual-mode power converter 30 between switchmode operation and conductionmode operation such that only a fraction of the power delivered to the load 39 is converted by the switchmode power converter 35. Peak power is conducted directly from the AC line to the DC output 42 during conduction-mode operation without requiring operation of the switchmode power converter 35.

Describing the dual-mode power converter 30 in more detail, the rectifier 32 includes diodes 45, 46 and silicon-controlled rectifiers (SCRs) 47, 48 configured to form a full-wave rectifier 49. More specifically, the AC line input 33 is connected to the anode of SCR 47 and the cathode of diode 45. Similarly, the AC line input 34 is connected to the anode of SCR 48 and the cathode of diode 46. The cathodes of SCRs 47 and 48 are connected to DC line 33', and the anodes of diodes 45 and 46 are connected to DC line 34', so as to provide a full-wave rectified DC input to the switchmode power converter 35.

The switchmode power converter 35 includes a switchmode inductor 50, a switchmode switch 51 such as a switchmode metal-oxide semiconductor field effect transistor (MOSFET), and a switchmode diode 52. A terminal of the inductor 50 is connected to DC line 33', and the other terminal is connected to the drain of MOSFET 51. The anode of diode 52 is also connected to the drain of MOSFET 51, and the cathode of diode 52 is connected to the positive DC output line 56 of the DC output 42. The source of MOSFET 51 is connected to DC line 34' through a current sense resistor 57. The source of MOSFET 51 is also connected to the negative DC output line 58.

The gate of MOSFET 51 is connected to the control circuit 37 via line 59. In the exemplary embodiment, MOSFET 51 is an n-channel depletion-type device. When the drive signal on line 59 is high (e.g., +15 volts), the MOSFET 51 is in an on state thereby presenting a very small impedance across its source and drain. When the drive signal on line 59 is low (e.g., 0 volts), on the other hand, MOSFET 51 is in an off state thereby presenting a substantially large impedance across its source and drain.

During switchmode operation, the control circuit 37 provides modulation of the drive signal on line 59. By modulating the drive signal on line 59 between high and low, for example, energy from the AC input is stored in the inductor 50 and is subsequently released through the diode 52 to the DC output 42. As a result, the power delivered to the DC output 42 is boosted by an amount determined by the value of the inductor 50 and the particular modulation rate as will be appreciated. Capacitor 60 provides for filtering of the DC output.

Although the invention is described using a n-channel depletion-type MOSFET 51, it will be appreciated that various other types of switches and corresponding control logic can be utilized without departing from the scope of the invention.

The conduction-mode diode 41, as mentioned above, provides a direct conduction path from the DC line 33' to the DC output 42. More specifically, the anode of diode 41 is connected to DC line 33' and the cathode is connected to the positive DC output line 56. As a result, whenever the DC input voltage on line 33' is greater than the output voltage on line 56 the diode 41 will be in a conduction state or mode.

Thus, power is conducted directly from the AC input to the DC output.

During switchmode operation, the control circuit 37 modulates the MOSFET 51 whereby the switchmode power converter 35 will convert power provided at the rectified AC input to the DC output 42. To the extent the voltage on line 33' ever exceeds the voltage on line 56 during switchmode operation, diode 41 nevertheless serves to provide a direct conduction path for power from the rectified AC input. During conduction-mode operation, the control circuit 37 causes the MOSFET 51 to remain in an off state. As a result, peak power from the rectified AC input is provided directly to the DC output via diode 41.

In a different embodiment the diode 41 may be omitted. In such case the inductor 50 and diode 52 provide the conduction path during conduction mode operation in addition to during switchmode operation. In yet another embodiment, the diode 41 can be replaced by a switch which is controllably closed during conduction-mode operation and open during switchmode operation. In the case of any of these embodiments, there is a sharing of the output power between the switchmode power converter 35 and the conduction-mode current path.

Referring now to the control circuit 37, a controller 65 provides general control of the dual-mode power converter 30. The controller 65 can be analog circuitry, a central processing unit (CPU) or another type of controller for carrying out the control functions described herein. The programming and operation of the controller 65 in order to carry out the functions described herein will be readily apparent to someone having ordinary skill in the art in view of the present disclosure. As a result, further detail has been omitted for sake of brevity.

The control circuit 37 also includes the current sense resistor 57 which is connected in series between the DC line 34' and the DC output line 58. A current sense operational amplifier 66 has its inverting and non-inverting inputs connected across the terminals of the current sense resistor 57. As a result, the amplifier 66 produces an output voltage at its output on line 68 which is proportional to the absolute value of the AC line current. The control circuit 37 further includes output voltage feedback into operational amplifier 69 operating as a differential amplifier having gain G. The inverting input of the amplifier 69 is connected to the positive DC output line 56. A voltage reference, Vref2, is connected to the non-inverting input of amplifier 69. Therefore, the amplifier 69 provides an output voltage at its output on line 70 which is proportional to the difference between the output voltage delivered to the load 39 and the reference voltage Vref2 multiplied by the gain G.

A sine reference operational amplifier 72 is also included in the control circuit 37. The inverting input of the amplifier 72 is connected to line 34' of the DC input. The non-inverting input of the amplifier 72, on the other hand, is connected to line 33' of the DC input. Accordingly, the amplifier 72 produces a reference signal at its output on line 73 which is proportional to the absolute value of the AC line voltage sinewave (e.g., follows the phase of the AC line voltage).

A single quadrant analog multiplier 75 multiplies the absolute value of the voltage sinewave reference signal on line 73 by the value of the output voltage error as represented on line 70. The output of the multiplier 75 on line 76 therefore represents an AC line voltage sinewave reference signal which is scaled relative to the DC output voltage error on line 56. This provides the soft voltage regulation of the DC output voltage. As is discussed further below, the voltage sinewave reference signal on line 76 represents an upper sinewave current limit and is connected to the non-inverting input of an upper current limit comparator 80.

The signal on line 76 is also connected to a resistor divider circuit 82 including resistors 83 and 84. More specifically, resistors 83 and 84 are connected in series between line 76 and ground. The node 85 between resistors 83 and 84 represents the output of the resistor divider network 82 and is representative of a predetermined fraction of the signal on line 76, such predetermined fraction being a function of the ratio of the values of resistors 83 and 84. The signal voltage at node 85 is used to represent a lower sinewave current limit and is connected to the inverting input of lower current limit comparator 87 via line 88.

The output of the current sense operational amplifier 66 is connected to the non-inverting input of the lower current limit comparator 87 and to the inverting input of the upper current limit comparator 80. As will be explained, the switchmode power converter 35 is controlled to maintain the input AC line current within an envelope defined by the upper and lower current limit comparators 80 and 87, respectively. Note that the outputs of comparators 80 and 87 are active low. Also the set ($\overline{S}$) and reset ($\overline{R}$) inputs of flip-flop 91 are likewise active low inputs. As long as the absolute value AC line current as sensed by the current sense resistor 57 and amplifier 66 remains above the lower current limit, the output of the comparator 87 will be high (i.e., a logic "0"). Whenever the AC line current falls below the lower current limit represented on line 88, the output of the comparator 87 will go low (i.e., a logic "1"). Similarly, as long as the AC line current remains below the upper current limit as represented on line 76, the output of the upper current limit comparator 80 on line 90 will remain high (i.e., a logic "0"). On the other hand, whenever the AC line current exceeds the upper current limit the output of comparator 80 will go low (i.e., a logic "1").

The output of the lower current limit comparator 87 is connected to the active low set ($\overline{S}$) input of S-R flip-flop 91. The output of the upper current limit comparator 80, on the other hand, is connected to the active low reset ($\overline{R}$) input of the S-R flip-flop 91. The power output (Q) of the S-R flip-flop 91 is connected to line 59 for driving and controlling the MOSFET 51. It should be further noted that the active low reset ($\overline{R}$) input always overrides the active low s et ($\overline{S}$) input.

When the AC line current falls below the lower current limit, the comparator 87 will apply a logic "1" to the $\overline{S}$ input of the flip-flop 91 while the comparator 80 will apply a logic "0" to the $\overline{R}$ input. As a result, the Q output on line 59 will go "high" causing the MOSFET 51 to turn on. On the other hand, when the AC line current exceeds the upper current limit the comparator 87 will apply a logic "0" to the $\overline{S}$ input of the flip-flop 91 while the comparator 80 will apply a logic "1" to the $\overline{R}$ input. Accordingly, the Q output on line 59 will go "low" causing the MOSFET 51 to turn off. Thus, the control circuit 37 provides a hysteretic form of current control as is explained below in connection with FIG. 5.

Figure 5:
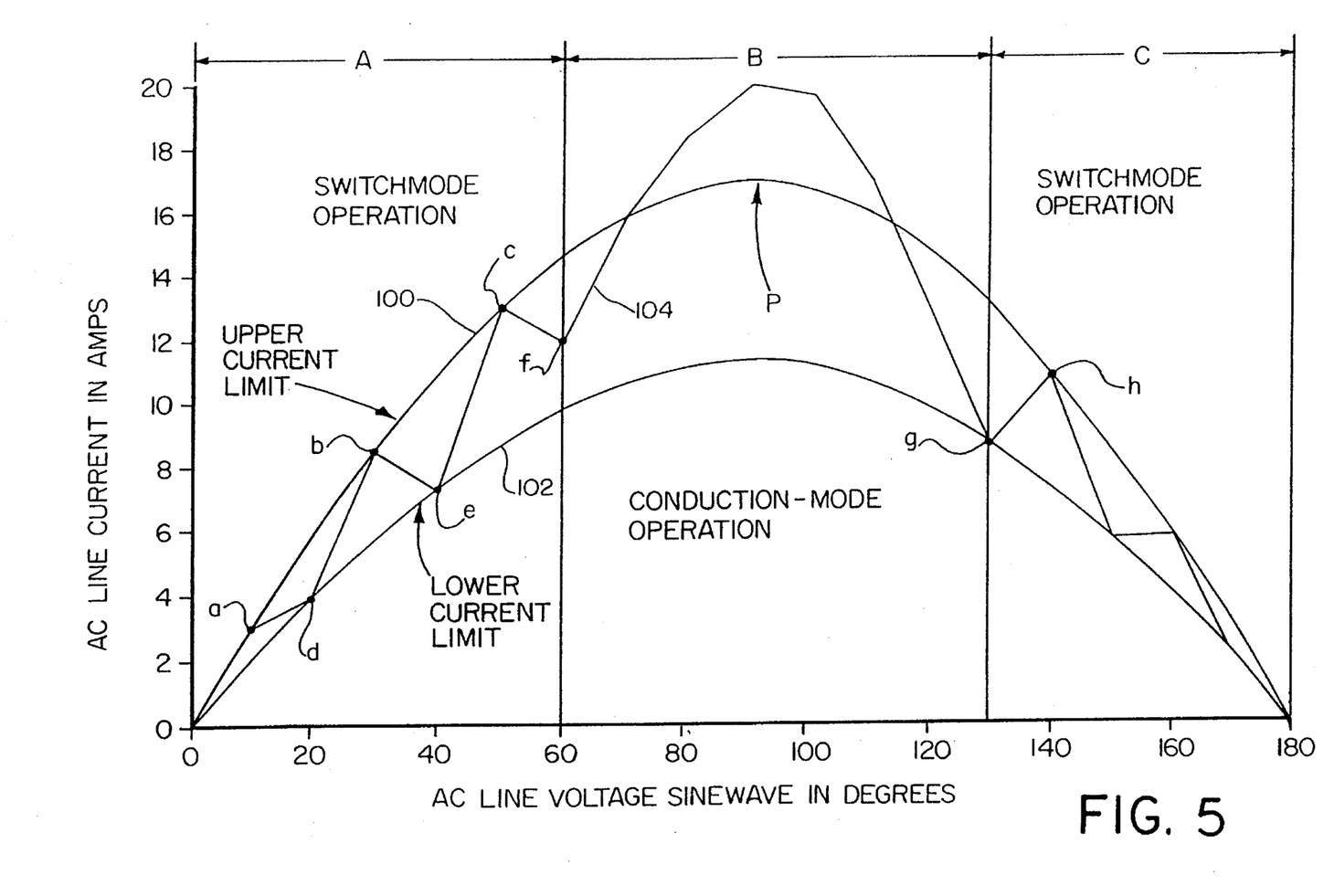
FIG. 5 is a waveform diagram of the AC line current using a dual-mode power converter in accordance with the present invention.

Referring now to FIG. 5, shown is waveform diagram of the AC line current as sensed by the current sense resistor 57 in accordance with the present invention. The waveform in FIG. 5 represents the input AC line current over one-half cycle of the AC line voltage, the remaining half-cycle being substantially identical. The vertical axis represents the AC line current in amperes, and the horizontal axis represents the AC line voltage sinewave in degrees. The curve 100 shown in dotted line represents the upper current limit established by the upper current limit comparator 80 (FIG. 4). The curve 102 shown in dotted line represents the lower current limit established by the lower current limit comparator 87 (FIG. 4). The curve 104 drawn in solid line represents the AC line current as sensed by the current sense resistor 57.

In FIG. 5, region A shows the AC line current during switchmode operation whereby the power delivered to the load 39 is handled substantially by the switchmode power converter 37 as the AC line voltage increases. Points a, b and c on the curve 104 represent those instances where the output of the flip-flop 91 causes the MOSFET 51 to turn off. As a result, the AC line current begins to decrease as the inductor 50 releases previously stored energy to the load 39. Points d and e represent those instances when the output of the flip-flop 91 causes the MOSFET 51 to turn on. As a result, the AC line current begins to increase as the inductor 50 becomes energized.

Based on the particular value of the output of the amplifier 69 and the values of resistors 83 and 84 (FIG. 4), the dual-mode power converter 30 allows the switchmode power converter 35 to deliver power to the load 39 up to a specified power level. Such specified power level is represented by the peak value P of the upper current limit. Above that level, the control circuit 37 will shut down the switchmode power converter 35 and allow the power to conduct directly from the AC input to the DC output via diode 41. Thus, following point c on the curve 104 the AC line current will temporarily decrease to point f as the inductor 50 releases its energy to the load 39. However, at point f the AC line current begins to increase as a result of the rectified AC line voltage on line 33' (FIG. 4) beginning to exceed the DC output voltage on line 56. As a result, the power from the AC input is conducted directly to the DC output via diode 41. During such time the MOSFET 51 remains in the off state, disabling the switchmode power converter 35, and the dual-mode power converter 30 operates in the conduction mode (region B).

The AC line current will begin to decrease following the peak of the AC line voltage sinewave. Thus, as the AC line current decreases it will eventually reach the lower current limit at point g. At such time, the output of the lower current limit comparator 87 will set the output of the flip-flop 91 to a logic "1" state thereby turning on the MOSFET 51. As a result, the dual-mode power converter 30 returns to switchmode operation using the switchmode power converter 35 (region C). The AC line current increases until it reaches the upper current limit at point h and the MOSFET 51 is turned off. Switchmode operation then continues through the remaining portion of the half-cycle. It will be appreciated therefore that the dual-mode power converter 30 will switch modes back and forth on every half of the AC voltage sinewave to deliver full power to the load 39.

As can be seen in FIG. 5, the upper and lower current limits 100 and 102 form a current limit envelope which follows the input AC voltage sinewave. The switchmode power converter 35 is controlled by the control circuit 37 to maintain the input AC current within the current limit envelope. This current limit envelope can be considered to be the maximum power curve for the switchmode power converter 35. If the output power demand to the load 39 exceeds this envelope, the switchmode power converter 35 turns off (region B) and power is directly conducted, rather than converted, to the DC output 42. Thus, the switchmode power converter 35 always operates during off-peak conditions, thereby minimizing the amount of power handled by the switchmode power converter 35. This enables the switchmode power converter 35 to utilize smaller-sized, lower-rated components as compared to a conventional switchmode power converter in which all power delivered to a load is handled by the switchmode power converter. The width of the current limit envelope can be set to a desired width based on the values of the resistors 83 and 84, as will be appreciated.

Note that the output DC voltage in the dual-mode power converter 30 is designed to be softly regulated to allow the output DC voltage to follow the AC voltage during the conduction-mode operation. More specifically, the output DC voltage delivered to the load 39 preferably is allowed to have a ripple voltage component to insure that the conduction-mode operation can be realized. Also, it will be appreciated that the output of the dual-mode power converter 30 will be slightly lower than the peak voltage of the input AC line voltage.

Figure 6:
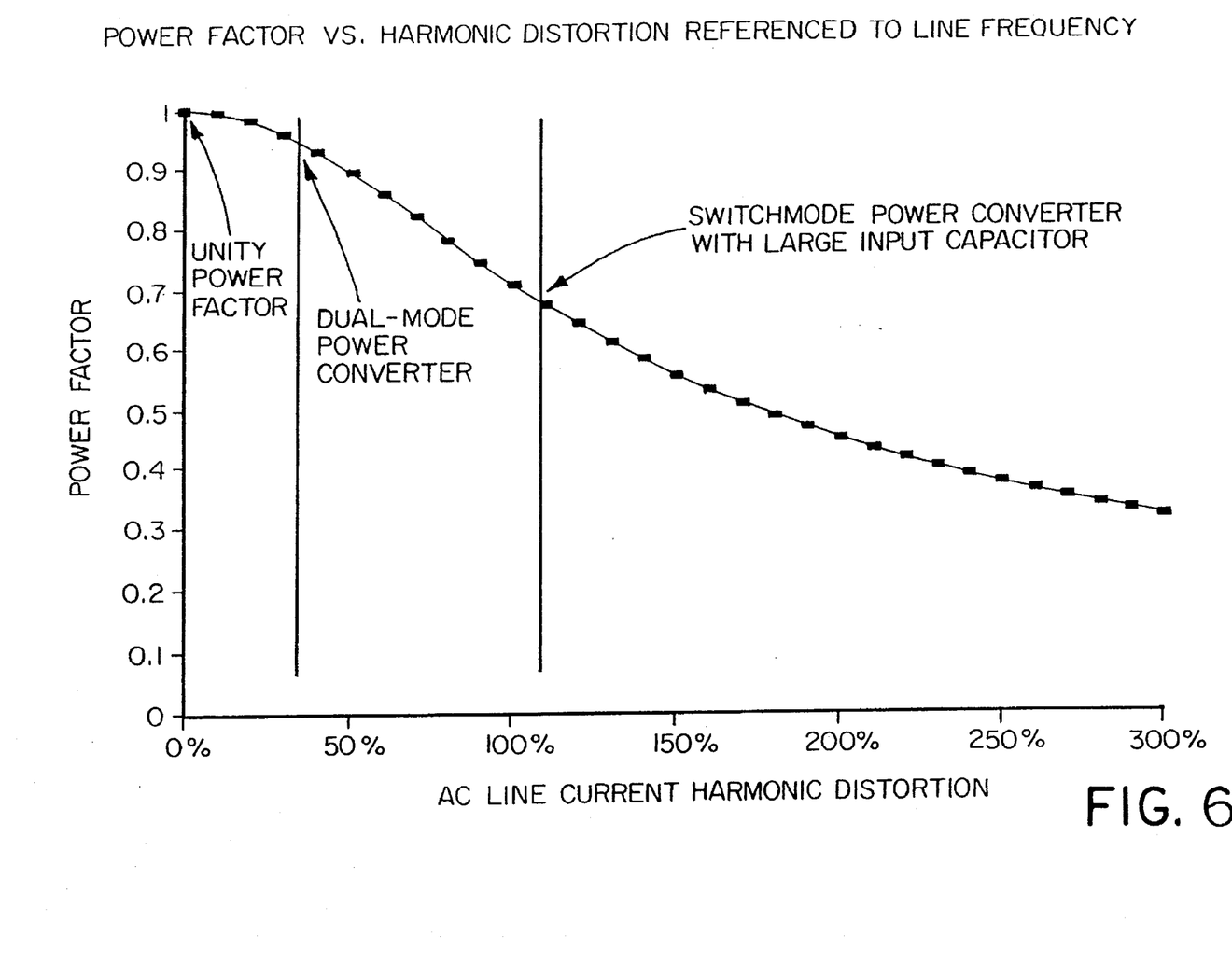
FIG. 6 shows a curve illustrating the relationship between power factor and AC line current harmonic distortion for both a dual-mode power converter in accordance with the present invention and a conventional switchmode power converter with a large input capacitor.

The dual-mode power converter 30 is operative to shape the input AC line current to substantially match the input AC line voltage sinewave as is illustrated in FIG. 5. As a result, the dual-mode power converter 30 controls and significantly improves the overall power factor of the AC-to-DC converter as compared to conventional switchmode power converters. For example, FIG. 6 illustrates a comparison of power factor to AC line current harmonic distortion for the dual-mode power converter 30 and a conventional power converter having a large input capacitor. More particularly, FIG. 6 illustrates the relationship between harmonic distortion of the input AC line current and the resulting power factor in each case. By shaping the input AC line current to substantially match the input AC line voltage, the dual-mode power converter 30 has a power factor of approximately 0.95 or more. A conventional switchmode power converter having a large input capacitor, as is typically the case, has a power factor of less than 0.70.

It is noted from FIG. 6 that there is a diminishing rate of return with respect to improvement in power factor as harmonic distortion is reduced. To achieve high power factors of over 0.90, it is necessary to reduce the harmonic distortion of the AC line current to less than 50%. While conventional power factor correction techniques can reduce harmonic distortion of the AC line to very low levels, often under 10%, such correction techniques combined with a conventional switchmode power converter is not cost effective. The loss in efficiency due to component losses in the power factor correction circuitry often outweighs any benefit obtained due to an improvement in power factor.

Figure 7:
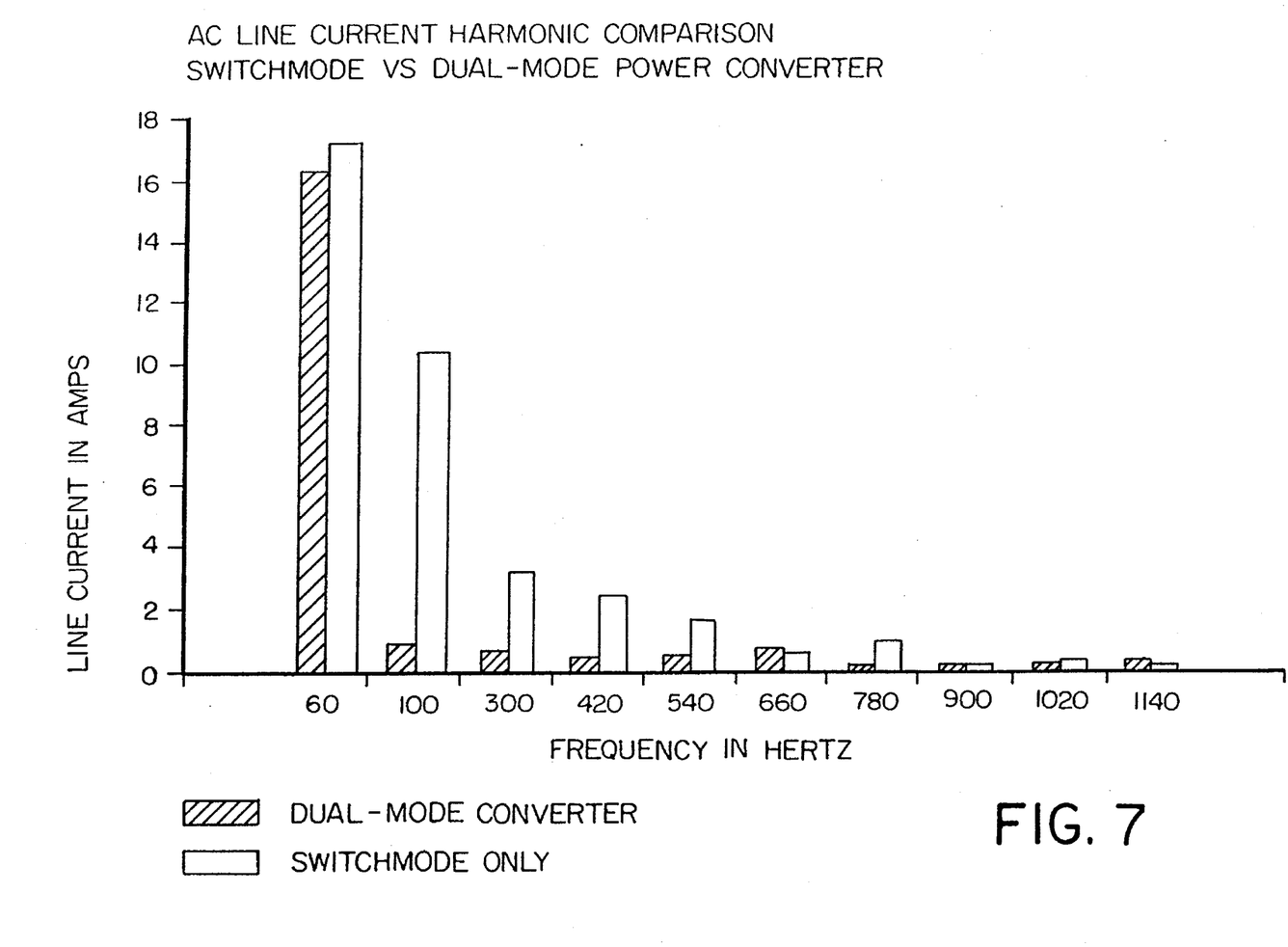
FIG. 7 is a bar graph comparing the harmonic content of the AC line current for a dual-mode power converter in accordance with the present invention and a conventional switchmode power converter.

FIG. 7 illustrates a comparison of the AC line current harmonic content between the dual-mode power converter 30 and a conventional switchmode power converter. Such a comparison was performed while both were delivering the same amount of output power. The dual-mode power converter 30 (represented by hatched bars) clearly produces less harmonic distortion on the AC line and thus will have a higher power factor. The conventional switchmode power converter (represented by solid bars) produces numerous odd harmonics with a resulting poor power factor. Thus, the physical size, cost and power capacity of the switchmode power converter 35 in the dual-mode power converter 30 may be on the order of one-half that of comparable conventional switchmode converters which deliver the same amount of output power.

Referring again to FIG. 4, the control circuit 37 also includes an overvoltage comparator 110 having an input connected to the positive DC output line 56. The comparator 110 compares the DC output voltage to a preselected reference voltage Vref1. If the DC output 42 is suddenly unloaded or has no load to start with, the DC voltage on line 56 will rise very sharply. If the DC output voltage rises high enough to reach the upper operating limit as set by Vref1, the comparator 110 will provide a logic "1" signal to the active low reset ($\overline{R}$) input of the flip-flop 91. As a result, the switchmode power converter 35 will shut down until the voltage is reduced below the Vref setpoint to begin normal operation again.

The output voltage on line 56 is also input to an output voltage sense input of the controller 65. A common problem with the use of a full-wave rectifier 32 is the need to control the initial current surge when AC line power is first applied. This line current is a result of filter capacitors (e.g., capacitor 60) being charged. The controller 65 monitors the DC output voltage on line 56 to detect a zero or low voltage condition indicating a power-up condition. When AC line power is first applied or if the AC line power is lost and then restored in a power-up condition, the controller 65 provides a control signal on line 112 to the gates of the SCRs 47 and 48. Preferably the control signal is timed whereby the SCRs 47 and 48 will initially block current through the full-wave bridge and then gradually ramp current up until the SCRs are in full conduction.

When AC line power is initially applied to the dual-mode power converter 30 and the control circuit 37 in particular, the controller 65 is configured to provide a logic "1" signal to the ($\overline{R}$) input of the flip-flop 91 to hold the switchmode power converter 35 and SCRs 47 and 48 in the off condition until all internal power supplies are stable and within voltage limits. Thereafter, if the AC line power should ever drop below specified limits, the controller 65 will again disable the switchmode power converter 35 until all internal power supplies are normal.

The controller 65 also includes a current sense input (not shown) connected to the output of the comparator 68. The controller 65 monitors the AC line current and if the current exceeds a predetermined operating limit, the controller 65 will shut off the SCRs 47 and 48 via line 112 thereby shutting down the system. A fault output signal is provided on line 115 to trigger an alarm or the like.

The control circuit 37 for modulating the MOSFET 51 has been described herein as incorporating relatively hardware intensive circuitry, i.e., logic, comparators, operational amplifiers, flip-flop, etc. It will be appreciated that the same control functions can be carried out using other, more sophisticated control circuitry, such as a digital signal processor (DSP) or the like. All such types of control are considered within the scope of the invention.

Although the invention has been shown and described with respect to certain preferred embodiments, it is obvious that equivalents and modifications will occur to others skilled in the art upon the reading and understanding of the specification. In addition, other switchmode topologies could be utilized to boost the rectified AC voltage to the DC output voltage. The present invention includes all such equivalents and modifications, and is limited only by the scope of the following claims.

What is claimed is:

1. A dual-mode power converter, comprising:

switchmode power converter means for converting and delivering power from an AC input to a DC output;

conduction mode means for delivering power directly from said AC input to said DC output; and control means for controlling operation of said switchmode power converter means and said conduction mode means as a function of said power delivered to said DC output.

2. The dual-mode power converter of claim 1, said control means comprising means for sensing an AC input current at said AC input.

3. The dual-mode power converter of claim 2, whereby if said AC input current falls below a predetermined current limit said control means activates said switchmode power converter means, and if said AC input current rises above said predetermined current limit said control means disables said switchmode power converter means.

4. The dual-mode power converter of claim 1, wherein said control means comprises means for activating said switchmode power converter means at the edges of an AC voltage sinewave input at said AC input, and for disabling said switchmode power converter means at the peak of said AC voltage sinewave.

5. The dual-mode power converter of claim 1, said control means comprising means for limiting the operation of said switchmode power converter means to delivering a predetermined maximum level of power to said DC output, and said conduction mode means delivers power to said DC output which exceeds said predetermined maximum level of power.

6. The dual-mode power converter of claim 1, said control means comprising means for controlling a power factor of said dual-mode power converter.

7. The dual-mode power converter of claim 6, said means for controlling said power factor comprising means for monitoring an AC input voltage sinewave at said AC input, and means for adjusting an AC input current at said AC input to substantially match said AC input voltage sinewave.

8. The dual-mode power converter of claim 7, wherein said means for adjusting comprises means for modulating a switch included in said switchmode power converter means.

9. The dual-mode power converter of claim 1, further comprising means for disabling said switchmode power converter means as a function of an output voltage at said DC output.

10. The dual-mode power converter of claim 1, further comprising means for limiting the flow of current through said AC input under power up conditions.

11. A dualmode power converter, comprising:

switchmode power converter means for converting and delivering power from an AC input to a DC output;

conduction mode means for delivering power directly from said AC input to said DC output; and control means for controlling operation of said switchmode power converter means and said conduction mode means as a function of said power delivered to said DC output, wherein said switchmode power converter means comprises an inductor and a diode connected in series between said AC input and said DC output, and said conduction mode means comprises a diode connected in parallel across said inductor and said diode.

12. A dualmode power converter, comprising:

switchmode power converter means for converting and delivering power from an AC input to a DC output;

conduction mode means for delivering power directly from said AC input to said DC output; and control means for controlling operation of said switchmode power converter means and said conduction mode means as a function of said power delivered to said DC output, wherein said switchmode power converter means comprises an inductor and a diode connected in series between said AC input and said DC output, and said conduction mode means comprises said inductor and said diode at times which said switchmode power converter means is disabled by said control means.

13. A dual-mode power converter, comprising:

switchmode power converter means for converting and delivering power from an AC input to a DC output when said dual-mode power converter is in a switchmode operating mode;

conduction mode means for delivering power directly from said AC input to said DC output when said dual-mode power converter is in a conduction operating mode; and control means for selectively causing said dual-mode power converter to operate according to said switchmode operating mode and said conduction operating mode as a function of a level of power delivered to said DC output.

14. The dual-mode power converter of claim 13, wherein said control means causes said dual-mode power supply to operate in said switchmode operating mode when said level of power delivered to said DC output is below a predetermined level, and to operate in said conduction operating mode when said level of power delivered to said DC output is above said predetermined level.

15. The dual-mode power converter of claim 13, wherein said control means comprises means for sensing an AC input current at said AC input.

16. The dual-mode power converter of claim 15, said control means further comprising means for sensing a phase of an AC input voltage sinewave at said AC input.

17. The dual-mode power converter of claim 16, wherein said control means is operative to control said switchmode power converter means and said conduction mode means to adjust said AC input current to substantially match said AC input voltage sinewave.

18. The dual-mode power converter of claim 13, further comprising means for controlling the power factor of said dual-mode power converter.

19. A method of controlling a dual-mode power converter including a switchmode power converter connected between an AC input and a DC output for converting and delivering power from said AC input to said DC output, and a conduction path connected between said AC input and said DC output for delivering power directly from said AC input to said DC output, said method comprising the steps of:

monitoring said power delivered to said DC output;

activating said switchmode power converter when said power delivered to said DC output is below a predetermined level, whereby said switchmode power converter delivers said power to said, DC output; and disabling said switchmode power converter when said power delivered to said DC output is above said predetermined level, whereby said conduction path delivers said power to said DC output.

20. The method of claim 19, further comprising the steps of monitoring an AC input voltage sinewave at said AC input and controlling an AC input current at said AC input in order to control a power factor of said dual-mode power converter.

* * * * *